(12) United States Patent
Yokoyama et al.

(10) Patent No.: US 11,530,068 B2
(45) Date of Patent: Dec. 20, 2022

(54) METHOD FOR MANUFACTURING CONTAINER AND METHOD FOR SEPARATING INNER LAYER

(71) Applicant: CANON KABUSHIKI KAISHA, Tokyo (JP)

(72) Inventors: Tetsuya Yokoyama, Kawasaki (JP); Shigeki Fukui, Kawasaki (JP); Hitoshi Takada, Yokohama (JP); Akira Shiba, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 16/388,720

(22) Filed: Apr. 18, 2019

(65) Prior Publication Data
US 2019/0329477 A1 Oct. 31, 2019

(30) Foreign Application Priority Data
Apr. 27, 2018 (JP) .............................. JP2018-087533

(51) Int. Cl.
*B29C 49/22* (2006.01)
*B65D 1/02* (2006.01)
*B05B 11/00* (2006.01)

(52) U.S. Cl.
CPC ........ *B65D 1/0215* (2013.01); *B05B 11/0041* (2018.08); *B29C 2949/3032* (2022.05)

(58) Field of Classification Search
CPC ........... B05B 11/0041; B05B 11/00412; B29C 49/221; B29C 49/22; B65D 1/0215; B29L 2031/7158; B29L 2009/001
See application file for complete search history.

(56) References Cited

U.S. PATENT DOCUMENTS

2019/0285508 A1 * 9/2019 Mathe ................. B29C 49/4273

FOREIGN PATENT DOCUMENTS

JP H08175568 A 7/1996

* cited by examiner

*Primary Examiner* — Monica A Huson
(74) *Attorney, Agent, or Firm* — Canon U.S.A., Inc. I.P. Division

(57) ABSTRACT

Provided is a method for manufacturing a container including a casing configured to contain a content, the casing including an inner layer having an inner layer opening and an outer layer having an air communication port communicating between a space between the outer layer and the inner layer and the outside. The method includes preparing a casing in which at least part of the inner layer and at least part of the outer layer are in contact with each other, inserting a support column inside the inner layer through the inner layer opening of the prepared casing, and separating the inner layer from the outer layer by supplying air into the space through the air communication port to bring part of the separated inner layer into contact with the support column. The support column includes a columnar portion and an extending portion extending from the columnar portion.

19 Claims, 12 Drawing Sheets

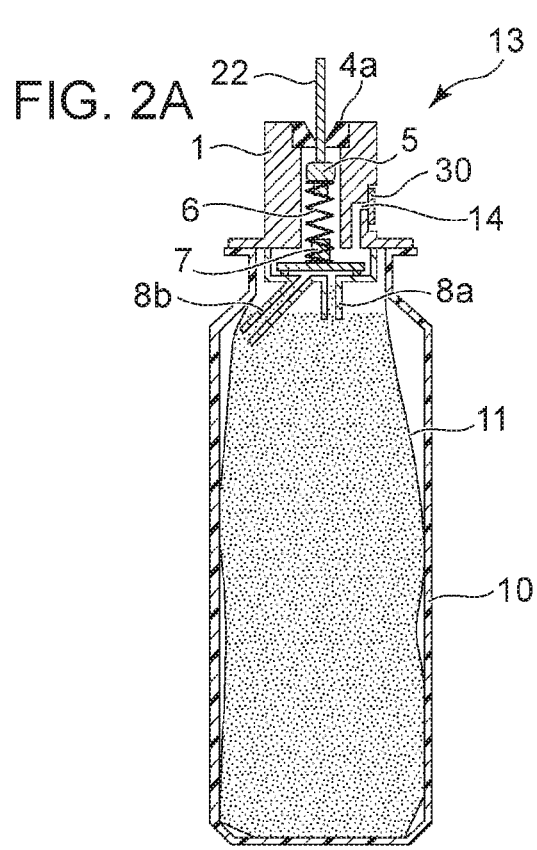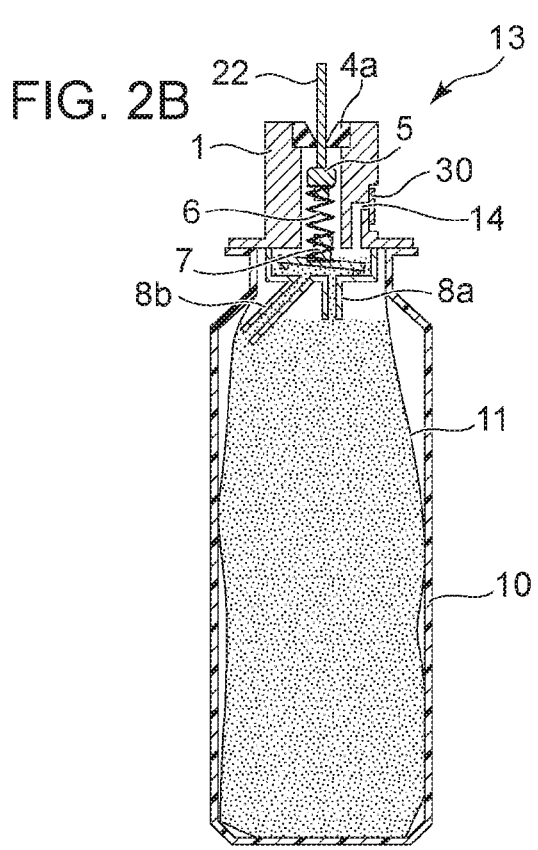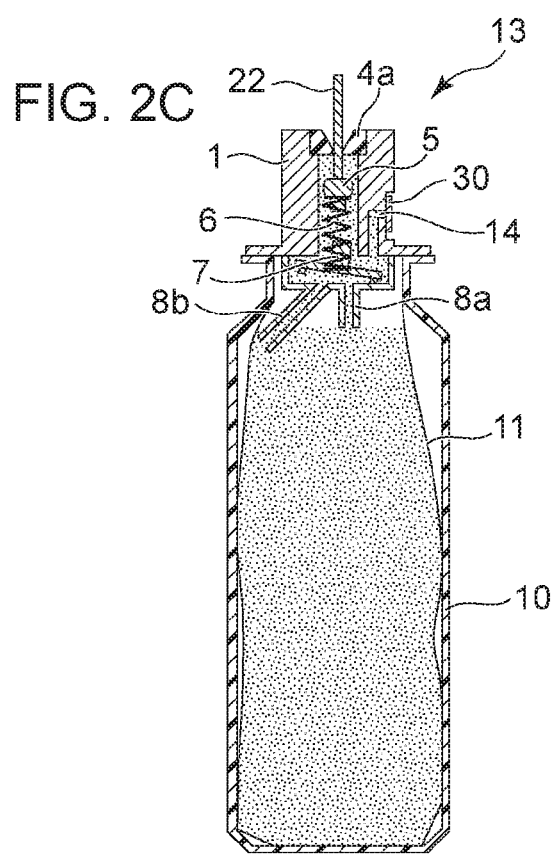

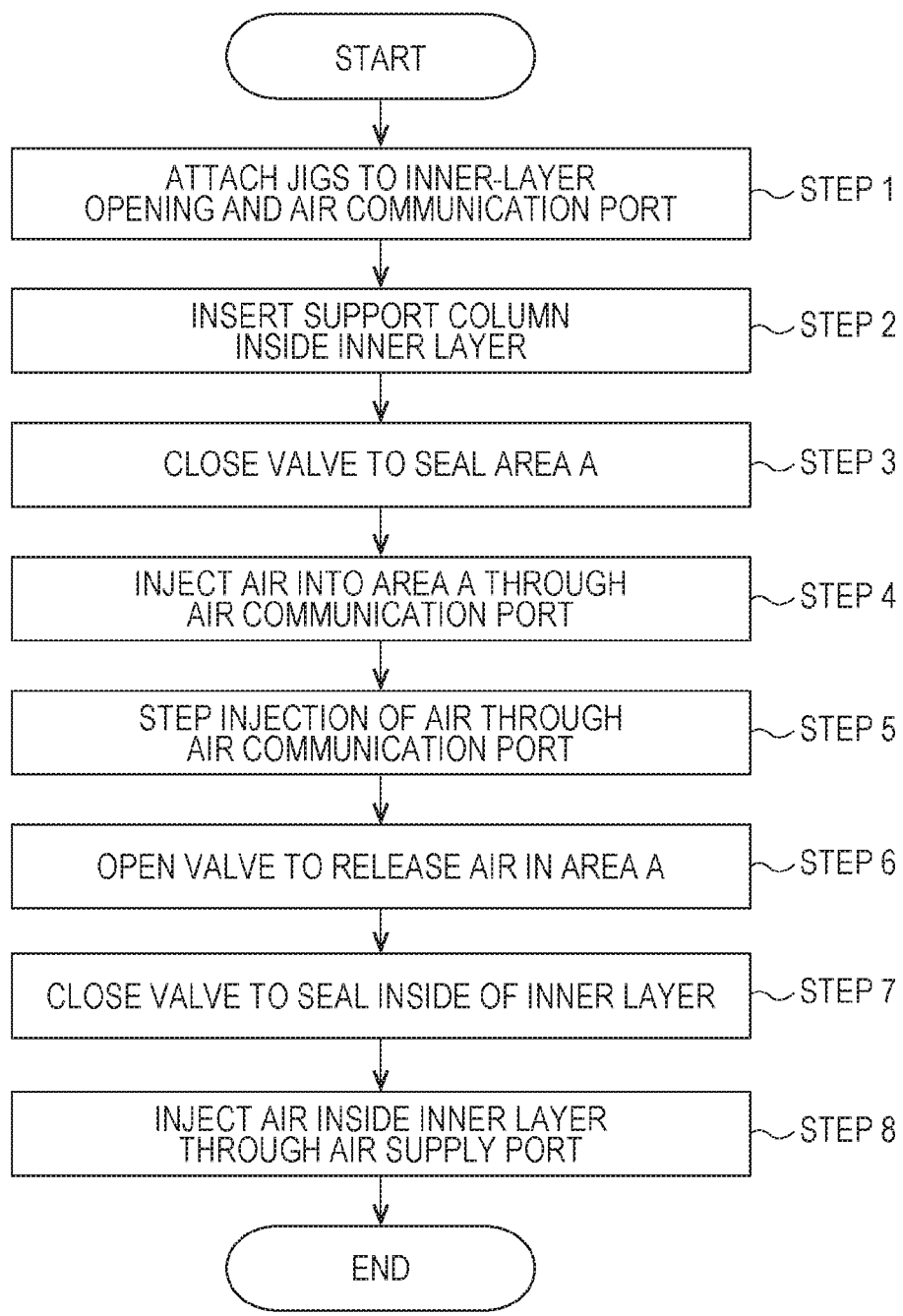

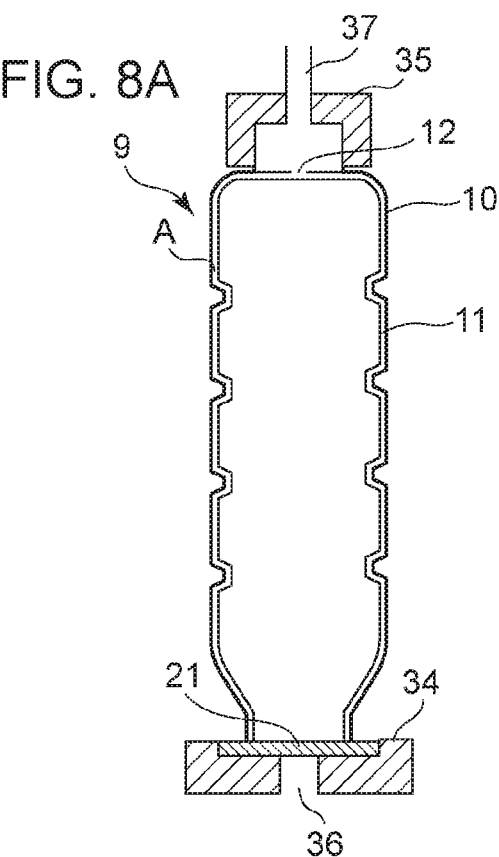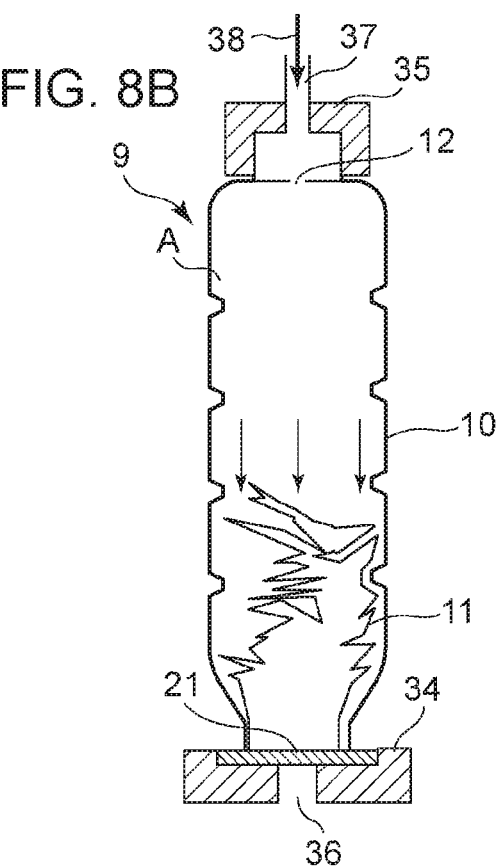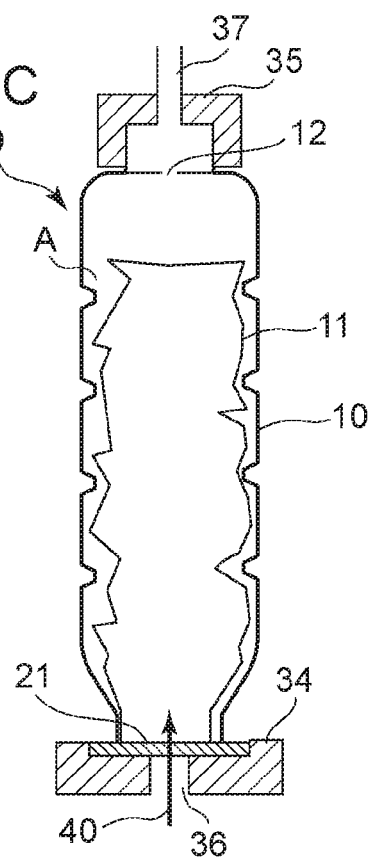

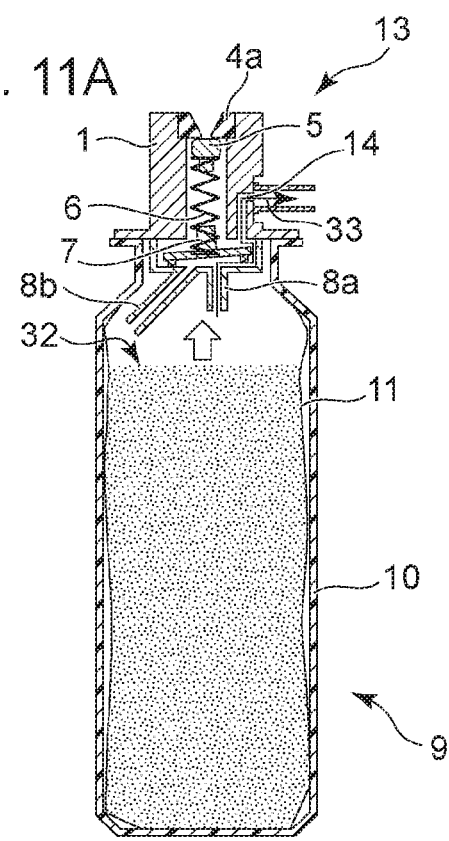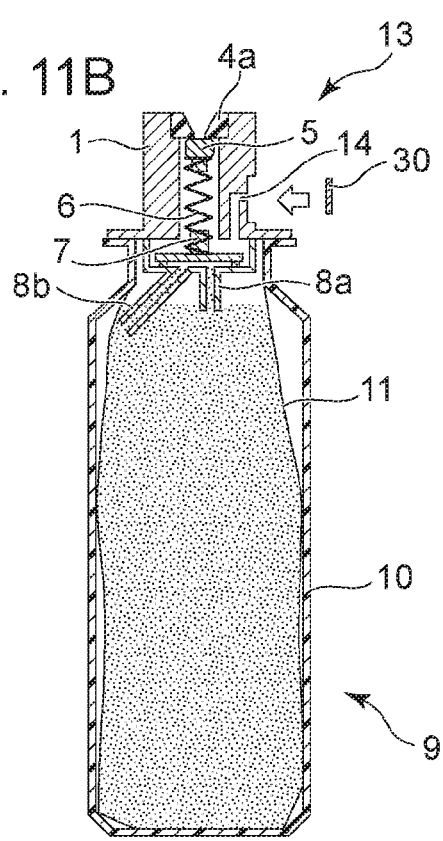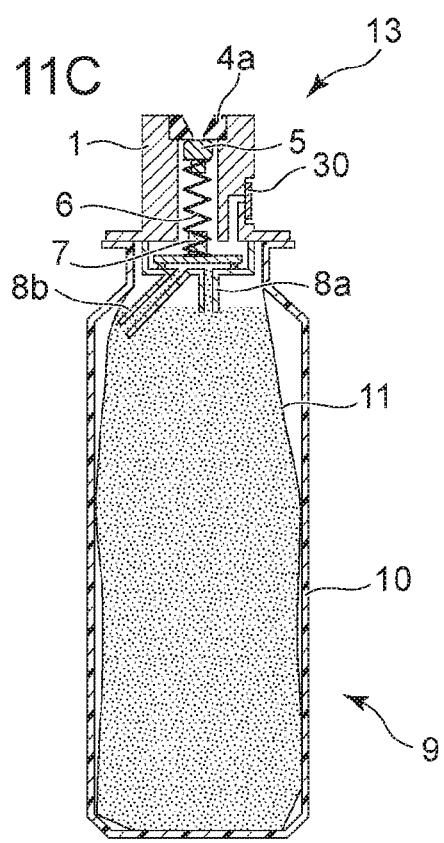

METHOD FOR MANUFACTURING CONTAINER AND METHOD FOR SEPARATING INNER LAYER

BACKGROUND OF THE DISCLOSURE

Field of the Disclosure

The disclosure relates to a method for manufacturing a container including an inner layer and an outer layer and a method for separating the inner layer.

Description of the Related Art

Containers including an inner layer and an outer layer and in which the inner layer is separated from the outer layer as the content is supplied to the outside are in widespread use. In general, in order to facilitate separation of the inner layer from the outer layer, a through-hole is provided in the outer layer so that air easily enters between the outer layer and the inner layer. However, the inner layer cannot be sufficiently separated from the outer layer merely by providing the through-hole in the outer layer, and the shape of the outer layer may be changed as the content is supplied to the outside.

In view of the above problems, it is described in Japanese Patent Laid-Open No. 8-175568 that the inner layer is separated from the outer layer during the manufacturing process. Specifically, the inner layer is separated by blowing air between the outer layer and the inner layer through a through-hole provided in the outer layer.

In the method for separating the inner layer disclosed in Japanese Patent Laid-Open No. 8-175568, the air inside the inner layer is exhausted outside while air is being blown between the inner layer and the outer layer. In other words, since the air in a space inside the inner layer is exhausted outside as the inner layer is separated from the outer layer to reduce the volume of the space inside the inner layer, the inner layer can be excessively deformed. The excessive deformation of the inner layer can cause wrinkles and folds of the inner layer to degrade the inner layer itself or cause the inner layer to not be sufficiently restored even through a restoring process for restoring the deformed inner layer.

SUMMARY OF THE DISCLOSURE

In an aspect of the disclosure, a method for manufacturing a container including a casing configured to contain a content is provided, the casing including an inner layer having an inner layer opening for supplying the content to an outside and an outer layer covering the inner layer and having an air communication port communicating between a space between the outer layer and the inner layer and the outside. The method includes the step of preparing a casing in which at least part of the inner layer and at least part of the outer layer are in contact with each other, the step of inserting a support column inside the inner layer through the inner layer opening of the prepared casing, and after the insertion step, the step of separating the inner layer from the outer layer by supplying air into the space through the air communication port to bring part of the separated inner layer into contact with the support column. The support column includes a columnar portion and an extending portion extending from the columnar portion in a direction intersecting a longitudinal direction of the columnar portion.

In another aspect of the disclosure, a method for separating an inner layer of a casing from an outer layer of the casing is provided, the casing being configured to contain a content and including an inner layer having an inner layer opening for supplying the content to an outside and an outer layer covering the inner layer and having an air communication port communicating between a space between the outer layer and the inner layer and the outside. The method includes the step of preparing a casing in which at least part of the inner layer and at least part of the outer layer are in contact with each other, the step of inserting a support column inside the inner layer through the inner layer opening of the prepared casing, and after the insertion step, the step of separating the inner layer from the outer layer by supplying air into the space through the air communication port to bring part of the separated inner layer into contact with the support column. The support column includes a columnar portion and an extending portion extending outward from the columnar portion.

Further features and aspects of the disclosure will become apparent from the following description of exemplary embodiments with reference to the attached drawings.

BRIEF DESCRIPTION OF THE DRAWINGS

FIG. 2A is a schematic diagram of the ink cartridge illustrating the internal ink flow when the interior of the joint is compressed, FIG. 2B is a schematic diagram of the ink cartridge illustrating the ink flow when the ink moves into the joint.

FIG. 2C is a schematic diagram of the ink cartridge illustrating the interior when the ink rises.

FIG. 6 is a flowchart for the first example embodiment.

FIG. 8A is a schematic diagram of a casing in which jigs are attached to an inner layer opening and an air communication port in a comparative example, FIG. 8B is a schematic diagram of the casing into which air is injected through the air communication port in the comparative example.

FIG. 8C is a schematic diagram of the casing in which air is injected inside the inner layer in the comparative example.

FIG. 10B is s a cross-sectional view of the joint taken along line XB-XB in FIG. 10A.

FIG. 11A is a schematic diagram illustrating releasing of air in the casing.

FIG. 11B is a schematic diagram illustrating closing of the space between the joint and the casing.

FIG. 11C is a schematic diagram illustrating sealing of an air vent port with a film.

DESCRIPTION OF THE EMBODIMENTS

The disclosure provides a method for separating the inner layer from the outer layer while suppressing excessive deformation of the inner layer.

A method for manufacturing a container and a method of separation according to embodiments of the disclosure will be described hereinbelow with reference to the drawings. First, the configuration of the container will be described, and then, a method for manufacturing the container and a method for separating the inner layer will be described. An ink cartridge including an inner layer and an outer layer will be described as an example of the container. The ink cartridge herein refers to a container that is installed in a liquid ejection apparatus that ejects droplets of ink or any another liquid onto a printing medium such as paper and that is configured to contain liquid such as ink. The container is not limited to the ink cartridge but may be any container configured to contain liquid or solid, such as food, cosmetics, detergent, chemicals, or toner.

Description of Example Ink Cartridge

Figure 1A:
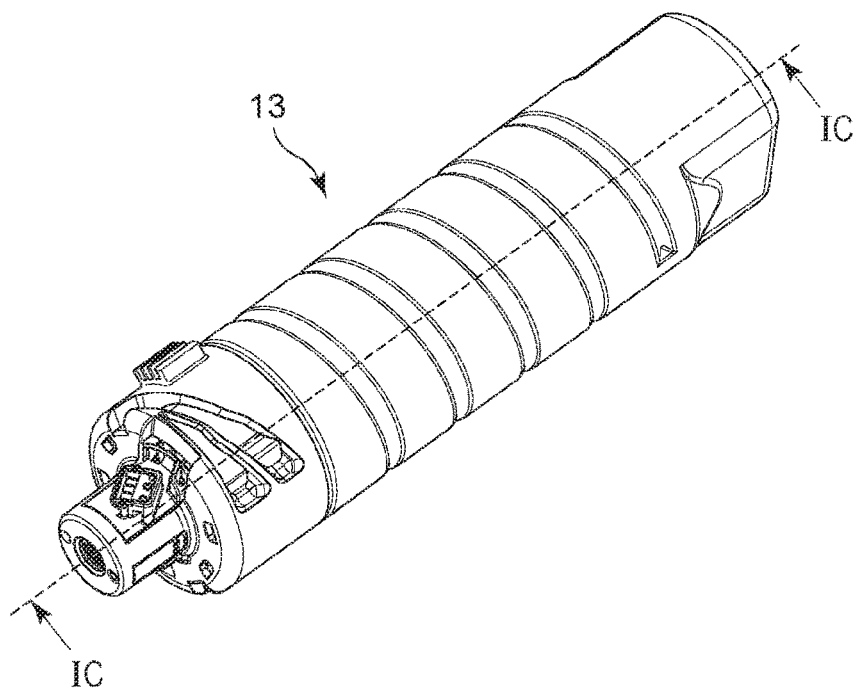
FIG. 1A is a perspective view of an ink cartridge according to an example embodiment of the disclosure.
Figure 1B:
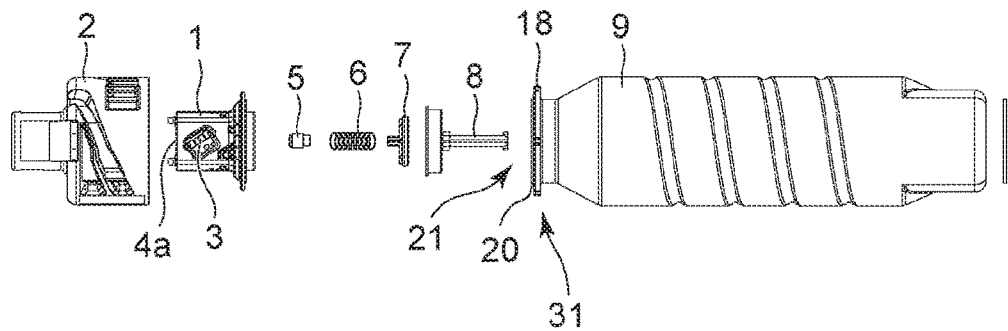
FIG. 1B is an exploded view of the ink cartridge.
Figure 1C:
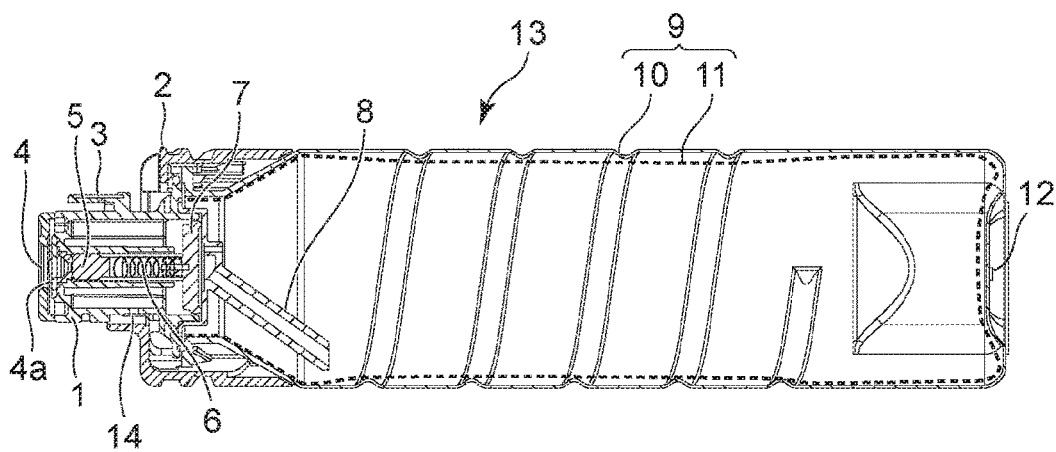
FIG. 1C is a cross-sectional view of the ink cartridge taken along line IC-IC in FIG. 1A.

FIGS. 1A to 1C and FIGS. 2A to 2C illustrate an ink cartridge 13 including an inner layer and an outer layer. FIG. 1A is a perspective view of the ink cartridge 13, FIG. 1B is an exploded view of the ink cartridge 13, and FIG. 1C is a cross-sectional view of the ink cartridge 13 of FIG. 1A taken along line IC-1C, FIGS. 2A to 2C are schematic diagrams of the ink cartridge 13 illustrating the internal ink flow when ink is supplied from the ink cartridge to a printing apparatus (not illustrated). Although FIGS. 2A to 2C illustrate a configuration in which ink is supplied upward in the vertical direction, the present disclosure is not limited to this example and may be configured to supply ink in all postures.

As illustrated in FIGS. 1A to 1C, the ink cartridge 13 mainly includes a joint 1, a cover 2, an inlet valve 5, a spring 6, an air-backflow check valve 7, an ink channel member 8, and a casing 9. Ink is contained in the casing 9. At the use of the ink cartridge 13, the ink is supplied to the printing apparatus from the interior of the casing 9 through the ink channel member 8 and the joint 1 in this order.

Description of Example Joint

At the end of the joint 1, an insertion portion 4 is provided into which an ink receiving tube 22 (FIGS. 2A to 2C) of the printing apparatus is inserted. The ink receiving tube 22 is shaped like a needle having a hole in a part and is inserted into the insertion portion 4 when the ink cartridge 13 is to be used. When the ink receiving tube 22 is inserted into the insertion portion 4, the ink receiving tube 22 pushes the inlet valve 5 to move the inlet valve 5 in a direction in which the spring 6 is compressed. When the ink receiving tube 22 is inserted into the joint 1 until the hole of the ink receiving tube 22 reaches ink that fills the interior of the joint 1, the ink flows into the hole of the ink receiving tube 22, so that the ink is supplied to the printing apparatus. While the ink cartridge 13 is not used, the inlet valve 5 is pushed against a sealing member 4a by the spring 6 so that the ink does not leak outside through the insertion portion 4.

The joint 1 is bonded to an inner layer flange 20 (FIG. 3C) by thermal fusion or the like after ink is contained in the casing 9. In order to supply ink into the joint 1, it is necessary to release the air in the casing 9. The joint 1 has an air vent port 14 as a hole for releasing the air. After the air is released through the air vent port 14, the air vent port 14 is sealed with a film 30 (FIGS. 2A to 2C). The details of the process for releasing the air will be described later.

The insertion portion 4 includes the sealing member 4a having an opening. When the ink receiving tube 22 is inserted into the insertion portion 4, the ink receiving tube 22 passes through the opening of the sealing member 4a. Examples of the material of the sealing member 4a include rubber and elastomer. The joint 1 further includes an electrode 3 that comes into electrical-contact with a connector pin or the like of the printing apparatus.

Description of Example Cover

As illustrated in FIG. 1C, the cover 2 is attached so as to cover the joint 1. The roles of the cover 2 include protecting the joint 1, in particular, the electrode 3, and guiding the insertion in mounting the ink cartridge 13.

Description of Example Air-Backflow Check Valve

A valve mechanism provided in the joint 1 will be described. An area of the spring 6 opposite to the inlet valve 5 is in contact with the air-backflow check valve 7. Disposing the air-backflow check valve 7 prevents the air in the casing 9 from flowing back into the casing 9 through the air vent port 14 during the period from the start of removing the air until sealing the air vent port 14 with the film 30 in the process of removing the air in the casing 9. Examples of the material of the air-backflow check valve 7 include polyethylene (PE), polypropylene (FP), and elastomer.

Description of Example Ink-Channel Member

The ink channel member 8 is used to supply the ink contained in the casing 9 into the joint 1. As illustrated in FIGS. 2A to 2C, the ink channel member 8 includes two channels of an upward channel 8a and a downward channel 8b. The upward channel 8a is used to supply the ink that is present vertically above in the casing 9 into the joint 1. The downward channel 8b is used to supply the ink that is present vertically lower than the ink supplied through the upward channel 8a into the joint 1. Supplying the ink through the two channels allows supplying ink of predetermined density to the printing apparatus. This is advantageous particularly in using pigment ink for printing. Example of the material of the ink channel member 8 include polyethylene (PE) and polypropylene (PP).

Description of Example Casing

The casing 9 is formed by injection blow molding and includes an outer layer 10 and an inner layer 11. The outer layer 10 constitutes the outer wall of the casing 9 and is indicated by the solid line in FIG. 1C. The inner layer 11 constitutes the container of the casing 9 and is indicated by the broken line in FIG. IC. The outer layer 10 has substantially the same inner surface shape as the outer surface shape of the inner layer 11. The outer layer 10 and the inner layer 11 are in close-contact with each other but can be separated from each other. Ink is contained inside the inner layer 11, as described above. The outer layer 10 and the inner layer 11 do not need to be in close-contact in the entire area. Part of the outer layer 10 and the inner layer 11 may be separated from each other. The casing may be cylindrical in shape from the viewpoint of blow molding.

The outer layer 10 and the inner layer 11 respectively include an outer layer flange 18 and an inner layer flange 20, such that the casing 9 includes a flange 31 constituted by the flanges 18 and 20. The flange 31 is a portion protruding in the direction perpendicular to the length of the casing 9. The flange 31 is provided mainly to secure a laminated preform 15 (FIGS. 3A to 3C) at injection blow molding, to fix a claw (not illustrated) of the cover 2, and to be welded to the joint 1.

Description of Example Outer Layer

The outer layer 10 is the outermost member of the ink cartridge 13 and serves as external covering. For this reason, the outer layer 10 may have higher rigidity than the rigidity of the inner layer 11 and may be molded from a high-rigidity material. Furthermore, the outer layer 10 may be molded from a material with high aptitude for injection blowing. Specifically, polyester resin selected from a group of polyethylene terephthalate (PET), polyethylene naphthalate, and polybutylene terephthalate may be used. In particular, polyethylene terephthalate may be used. This is because polyethylene terephthalate has a property that its viscosity rises sharply when stretched by air blowing at blow molding. Due to this property, a thick portion that has not yet been stretched stretches, but a thin portion that has been stretched becomes hard to stretch, thus reducing or eliminating variations in the thickness of the outer layer 10.

As illustrated in FIG. IC, an air communication port 12 is provided at the bottom of the outer layer 10, that is, a position opposing an inner layer opening 21. The air communication port 12 has two roles. The first role is to supply air into the area between the outer layer 10 and the inner layer 11 through the air communication port 12 at the process of separating the inner layer 11, described later. The details will be described when a method for manufacturing the ink cartridge 13 is described. The second role is to suppress deformation of the outer layer 10 when the volume of the ink contained inside the inner layer 11 is reduced to cave the inner layer 11 at the use of the ink cartridge. Since the area between the outer layer 10 and the inner layer 11 is always communicated with the atmosphere due to the air communication port 12, the area between the outer layer 10 and the inner layer 11 is under atmospheric pressure also in the use of the ink cartridge 13. This causes no pressure difference between the air outside the outer layer 10 and the air between the outer layer 10 and the inner layer 11, thereby preventing the outer layer 10 from being caved.

The inner layer 11 has no air communication port and is closed except the portion communicating with the ink receiving tube 22 of the printing apparatus. For this reason, when the volume of the ink decreases, the pressure of air present inside the inner layer 11 becomes lower than the atmospheric pressure, such that the inner layer 11 is caved until the air balances with the atmospheric pressure. When the contained ink is used up, the inner layer 11 is substantially completely collapsed.

Description of Example Inner Layer

The inner layer 11 may be molded with a flexible material from the viewpoint of enhancing the use-up of the ink. Examples of the material of the inner layer 11 include polyolefin resin, olefin-based thermoplastic elastomer, and styrene-based thermoplastic elastomer. At least one of the materials may be used as the material of the inner layer 11. In the case where the inner layer 11 and the outer layer 10 are molded in one operation by injection blow molding, the materials of the inner layer 11 and the outer layer 10 may be selected so that the temperature of the material of the outer layer 10 suitable for air blowing and the temperature of the material of the inner layer 11 suitable for air blowing are close to each other. Specifically, polyethylene terephthalate may be used as the material of the outer layer 10, and at least one of polyethylene and polypropylene may be used as the material of the inner layer 11. In particular, among polypropylenes, linear low-density polyethylene (LLDPE) may be used from the viewpoint of flexibility and aptitude for injection blowing. The inner layer 11 preferably has a bending elastic modulus of 1,000 MPa or less and 300 MPa or more.

Description of Example Ink Supply

When ink is supplied from the ink cartridge 13 to the printing apparatus, first, the ink receiving tube 22 of the printing apparatus is inserted into the insertion portion 4 of the ink cartridge 13 to decompress the interior of the joint 1 (FIG. 2A). This decompression causes the air-backflow check valve 7 to open, and the ink in the casing 9 moves into the joint 1 through the ink channel member 8 (FIG. 2B). Thereafter, the ink rises to the hole not illustrated) of the receiving tube 22 (FIG. 2C), and the ink is supplied from the joint 1 to the printing apparatus through the ink receiving tube 22.

Example Method for Manufacturing Ink Cartridge

Next, a method for manufacturing the ink cartridge will be described. The ink cartridge is manufactured by manufacturing a casing in which the inner layer and the outer layer are integrated by injection blow molding, then undergoing a separation process for separating the inner layer from the outer layer, and finally welding the inner layer flange of the casing and the joint together. The individual processes will be described hereinbelow in sequence.

Example Preform

Figure 3A:
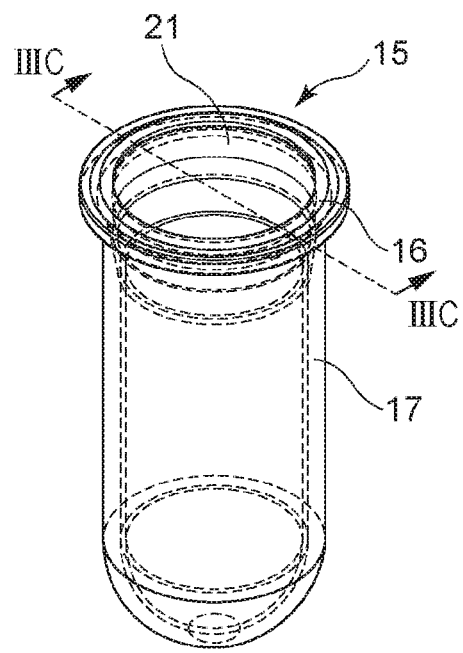
FIGS. 3A and 3B are schematic perspective views of a laminated preform viewed at different angles.
Figure 3B:
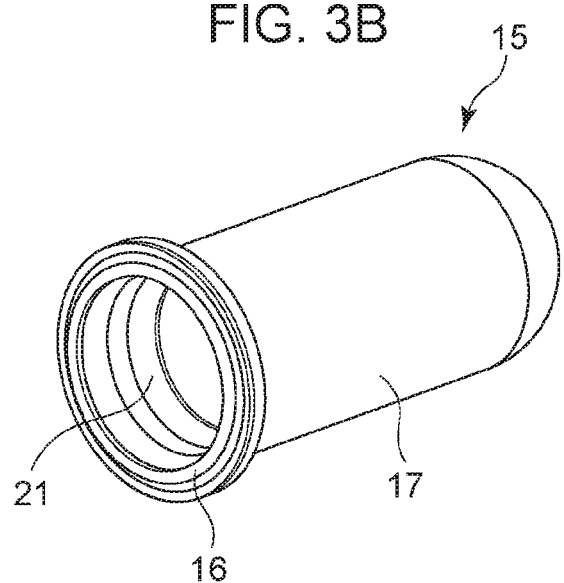
Figure 3C:
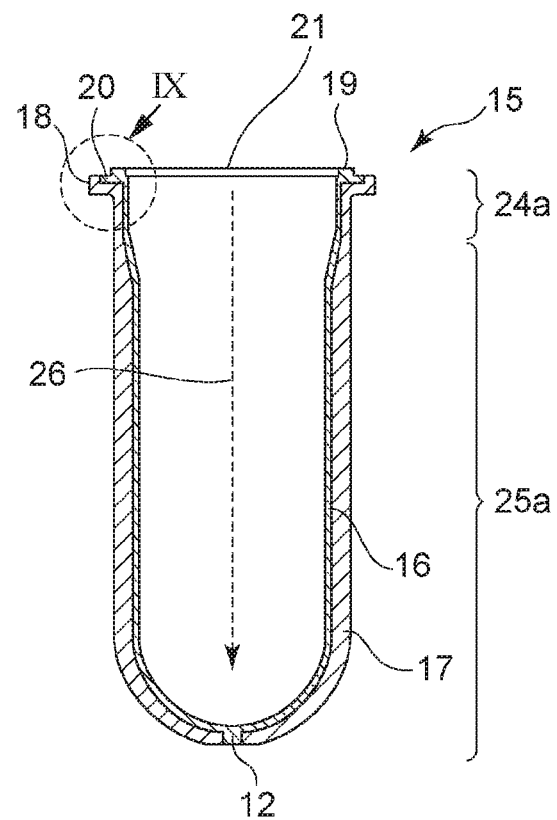
FIG. 3C is a cross-sectional view of the laminated preform taken along line IIIC-IIIC in FIG. 3A.

The casing 9 is produced by blow molding the laminated preform 15 produced by injection molding. First, the laminated preform 15 will be described with reference to FIGS. 3A to 3C. FIGS. 3A to 3C are diagrams illustrating the laminated preform 15 for use in molding the casing 9. FIGS. 3A and 3B are perspective views of the laminated preform 15 viewed at different angles. FIG. 3C is a cross-sectional view of the laminated preform 15 taken along line IIIC-IIIC of FIG. 3A. The laminated preform 15 is produced by injection molding. The laminated preform 15 is a two-layer preform in which an inner-layer preform 16 that is formed into the inner layer 11 and an outer-layer preform 17 that is formed into the outer layer 10 by blow molding are laminated (described below). The inner-layer preform 16 and the outer-layer preform 17 may be injection molded by one operation or separately. The inner-layer preform 16 and the outer-layer preform 17 may be injection molded by one operation. This is for the purpose of increasing the adhesion of the outer layer flange 18 and the inner layer flange 20 to suppress deformation of the inner layer 11 due to post-shrinkage after blow molding.

As illustrated in FIG. 3C, the laminated preform 15 includes a non-blown portion 24a and a blown portion 25a. The non-blown portion 24a is a portion whose shape does not substantially change before and after blow molding. The blown portion 25a is a portion that is blow-molded into a bottle shape to change in shape before and after the blow molding. Thus, the non-blown portion 24a of the laminated preform 15 is molded into the casing without substantial change in shape, and the blown portion 25a of the laminated preform 15 is molded into the casing, with the shape changed.

Description of Example Blow Molding

After the laminated preform 15 is produced by injection molding, the laminated preform 15 is set on a blow carrier (not illustrated). The blown portion 25a of the laminated preform 15 is heated with a heater to heat both of the blown portions of the inner-layer preform 16 and the outer-layer preform 17 to a glass transfer temperature or more. Thereafter, the laminated preform 15 is inserted into a mold (not illustrated), and the inside of the laminated preform 15 is drawn in a drawing direction 26 (hereinafter simply referred to as "drawing direction") using a drawing rod (not illustrated). Air of about 30 atmospheric pressure is introduced inside the laminated preform 15 while the laminated preform 15 is being drawn to mold the laminated preform 15 to a desired shape of the casing.

Specifically, injection blow molding was performed using an injection blow molding machine (FRB-1, made by Frontier). In the injection blow molding, a laminated preform was heated from the outside using a halogen heater while the laminated preform was being rotated. Specifically, the laminated preform was heated for 50 seconds with six heaters arranged at 15 trim pitch at positions 20 mm from the surface of an outer-layer preform. The output values of the heaters were adjusted so that the outer layer temperature after the heating process reaches 70° C. or more and 160° C. or less. The molding temperature was checked by measuring the temperature of the laminated preform immediately after the heating (that is, the outer layer temperature immediately before the blowing) using a non-contact temperature sensor. After the heated laminated preform was inserted into a mold, the mold was closed, and a drawing rod was put inside the laminated preform and drawn in the drawing direction. At the same time, air of 30 atmospheric pressure was introduced to mold the whole of the laminated preform into a bottle shape. Thus, the casing of the ink cartridge was molded.

It is also possible to separately produce the inner layer and the outer layer by injection blow molding, and then put the inner layer and the outer layer one on the other. However, producing the inner layer and the outer layer by one operation by injection blow molding may reduce the number of processes more and produce an ink cartridge with higher volume efficiency.

Size of Example Casing

The casing 9 preferably has a height of 40 mm or more and 350 mm or less in the viewpoint of the drawable size of the laminated preform 15. The height herein refers to the length of the laminated preform 15 in the drawing direction. From the same point of view, the width (maximum outside diameter) of the blown portion of the casing 9 is preferably 10 mm or more and 130 mm or less. The width herein refers to the length of the laminated preform 15 in a direction perpendicular to the drawing direction.

The thickness (wall thickness) of the blown portion of the casing 9 can be determined from the sizes of the laminated preform 15 and the blow-molded container. Specifically, the thicknesses of the outer layer 10 and the inner layer 11 are preferably respectively set to 0.05 mm or more and 3.00 mm or less. In the case where the outer layer 10 and the inner layer 11 are produced by injection blow molding by one operation, the thickness of the outer layer 10 is more preferably set to 0.30 mm or more and 2.00 mm or less from the viewpoint of strength. The thickness of the inner layer 11 is more preferably set to 0.05 mm or more and 0.20 mm or less from the viewpoint of flexibility.

Example Method for Separating Inner Layer

Since the inner layer 11 and the outer layer 10 are at least partly in contact with each other by the injection blow molding described above, the inner layer 11 of the casing 9 is separated from the outer layer 10 after the casing 9 is produced. The separation of the inner layer 11 will be described hereinbelow with reference to the drawings. All pressure values below are expressed in gauge pressure representation.

Example First Embodiment

Figure 4A:
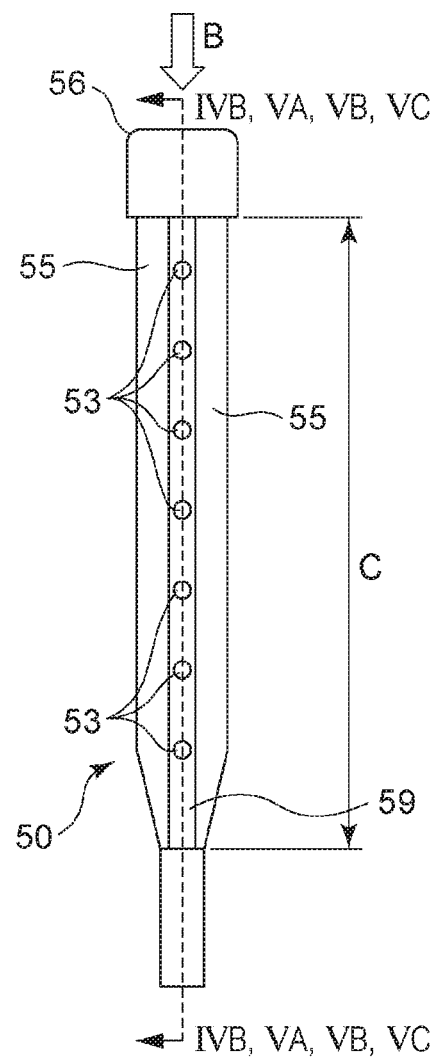
FIG. 4A is a schematic diagram of a support column according to a first embodiment of the present disclosure.
Figure 4B:
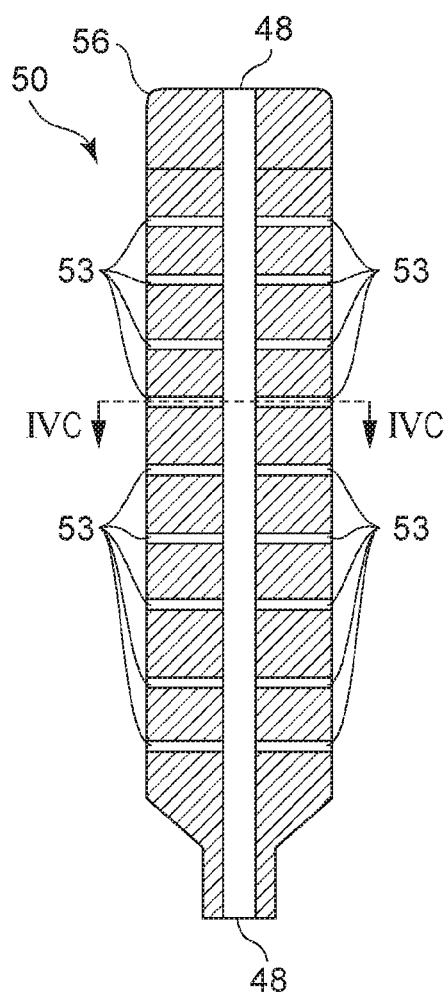
FIG. 4B is a schematic diagram illustrating a IVB-IVB cross section of FIG. 4A.
Figure 4C:
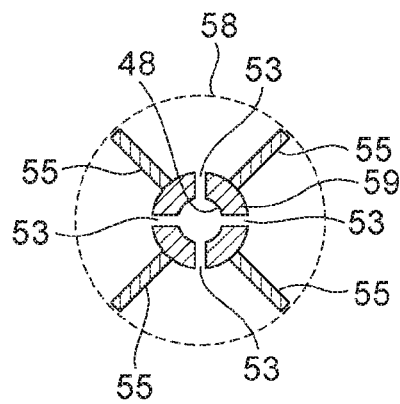
FIG. 4C is a IVC-IVC cross section of FIG. 4B.
Figure 5A:
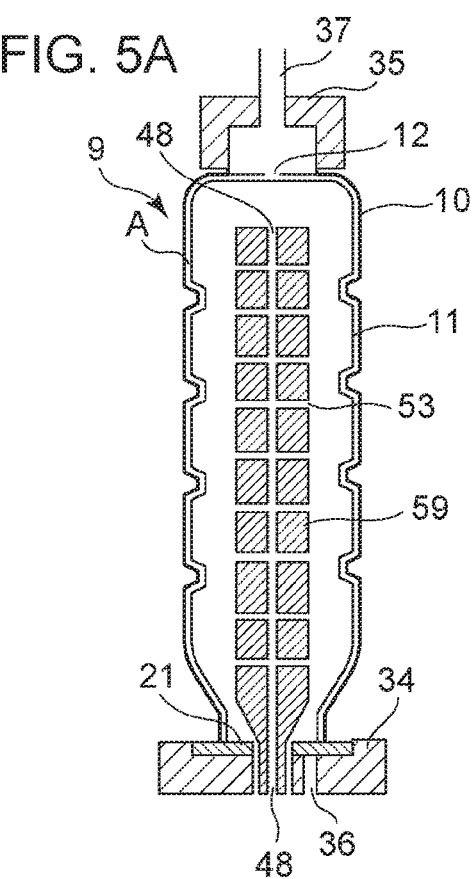
FIG. 5A is a schematic diagram of a casing in which jigs are attached to an inner layer opening and an air communication port.
Figure 5B:
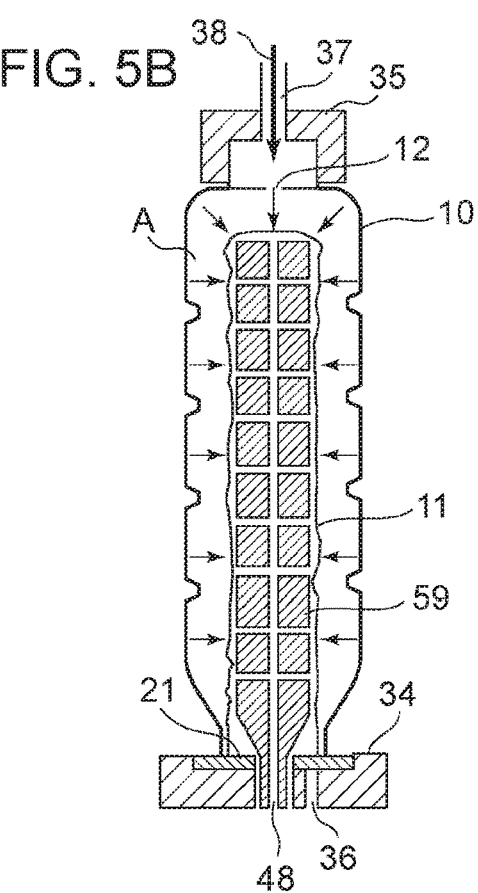
FIG. 5B is a schematic diagram of the casing into which air is supplied through the air communication port.
Figure 5C:
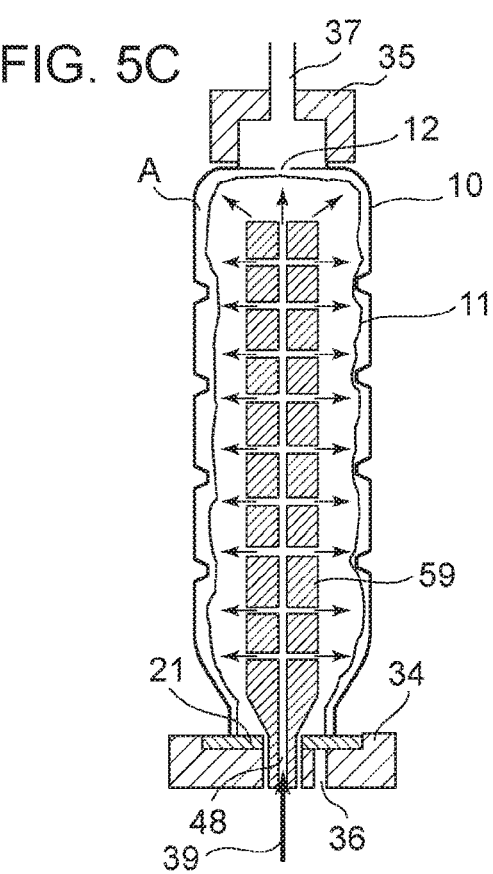
FIG. 5C is a schematic diagram of the casing in which air is injected inside the inner layer.

Next, a method for separating the inner layer 11 according to the disclosure will be described with reference to FIG. 4A to FIG. 6. Referring to FIGS. 4A to 4C, a support column, which is to be inserted inside the inner layer when the inner layer is to be removed, will be first described. Referring next to FIGS. 5A to 5C, a method for separating the inner layer 11 will be described. Referring finally to FIG. 6, a system for separation will be described. FIGS. 5A to 5C respectively illustrate the support column 50 in FIG. 4A taken along lines VA-VA, VB-VB, and VC-VC for illustrative purposes.

Description of Example Support Column

FIG. 4A is a schematic diagram of a support column 50. FIG. 4B is a schematic diagram illustrating a IVB-IVB cross section of FIG. 4A. FIG. 4C is a IVC-IVC cross section of FIG. 4B. The support column 50 includes a cylindrical columnar portion 59 and extending portions 55. The extending portions 55 extend from the columnar portion 59 in directions intersecting the longitudinal direction of the columnar portion 59. In FIGS. 4A to 4C, the columnar portion 59 and the extending portions 55 intersect at right angles. The support column 50 has, at the lower portion in the vertical direction, an air supply port 48 for supplying air supplied from an air pressure source 41 (FIG. 7) (described later) to into the support column 50. The support column 50 further has, on the periphery, a plurality of peripheral air supply ports 53 for discharging the air supplied into the support column through the air supply port 48. The air supply port 48 and the peripheral air supply ports 53 communicate with each other in the support column 50. As illustrated in FIGS. 5A to 5C, the support column 50 is attached to a jig 34.

A cap 56 is disposed at an end of the support column 50. At the end of the support column 50, the corners of the extending portions 55 are disposed. Covering the corners of the extending portions 55 with the cap 56 prevents damage to the inner layer 11 when the inner layer 11 comes into contact with the corners in the separation process, described later. Likewise, in order to prevent damage to the inner layer 11, the corners and the ridges of the extending portions 55 may be rounded (chamfered).

In the present embodiment, as illustrated in FIGS. 4A to 4C, the peripheral air supply ports 53 are arrayed in four columns along the length of the support column 50. The present disclosure is not limited to this configuration. It is only required that the peripheral air supply ports 53 are provided in the periphery of the support column 50.

Description of Example Inner Layer

Referring to FIGS. 5A to 5C and FIG. 6, a method for separating the inner layer 11 in the present embodiment will be described. First, the casing 9 molded by injection blow molding described above is attached to the jigs 34 and 35 (Step 1 in FIG. 6) Specifically, as illustrated in FIG. 5A, the jigs 34 and 35 are respectively attached to the inner layer opening 21 and the air communication port 12 of the casing 9. Since the support column 50 is attached to the jig 34, the support column 50 is inserted inside the inner layer 11 by attaching the casing 9 to the jig 34 (Step 2 in FIG. 6, referred to as "insertion step"). The jigs 34 and 35 respectively have air supply ports 36 and 37 for supplying air. Since the respective air supply ports 36 and 37 of the jigs 34 and 35 are open to the atmosphere, the pressure inside the inner layer 11 and the pressure of the area between the inner layer 11 and the outer layer 10 (hereinafter referred to as "area A") are both atmospheric pressure (0 kPa). Next, a valve 43a (FIG. 7) attached to the jig 35 is closed to make the area A an enclosed space (Step 3 in FIG. 6). Thereafter, air is injected into the area A through the air communication port 12 using the air pressure source 41 (FIG. 7) communicating with the jig 35 (Step 4 in FIG. 6, referred to as "air injection step", arrow 38 in FIG. 5B). At that time, the air injection pressure is about 350 kPa. Assuming that injecting air into the area A for about one seconds and then stopping the injection is one cycle, air injection is performed for five cycles, about five seconds in total. Such intermittent air injection makes it easier to separate the inner layer 11 from the outer layer 10 than continuous air injection for about five seconds. Injecting air into the area A causes a pressure difference (about 350 kPa) between the inside of the inner layer 11 and the area A to push the inner layer 11 inside the inner layer 11, causing the inner layer 11 to be separated from the outer layer 10.

At this time, the inner layer 11 begins to separate at a portion near the air communication port 12 toward the inner layer opening 21, and the separated inner layer 11 comes into contact with the support column 50. If the surface area of the inner layer 11 is relatively large, and the surface area of the support column 50 is small, the separated inner layer 11 comes into contact with the support column 50 while overlapping with the separated inner layer 11, such that the inner layer 11 is creased. This can cause insufficient restoration of the inner layer 11 in the restoration step (described later). An example of the support column with a small surface area is a cylindrical support column with a diameter of 58 illustrated in FIG. 4B.

Since the support column 50 in the present embodiment is configured such that the extending portions 55 are attached to the columnar portion 59, the surface area is larger in an area C of the support column 50 (FIG. 4A) than the surface area of the cylindrical support column with a diameter of 58, indicated by the dotted line in FIG. 4C. In other words, the area in which the separated inner layer 11 can come into contact with the support column 50 is large. Thus, even if the surface area of the inner layer 11 is relatively large because of the large diameter of the casing 9, the present embodiment allows the inner layer 11 to be separated while suppressing excessive deformation of the inner layer 11 such that the inner layer 11 is creased.

After the inner layer 11 is separated from the outer layer 10 over substantially the entire area, that is, after substantially the entire area of the inner layer 11 comes into contact with the support column 50 (FIG. 5B), the air injection through the air communication port 12 is stopped (Step 5 in FIG. 6) Next, a valve 43 attached to the jig 35 (FIG. 7) is opened to open the area A to the atmosphere (Step 6 in FIG. 6). Next, a valve 43b attached to the jig 34 (FIG. 7) is closed to make the inside of the inner layer 11 an enclosed space (Step 7 in FIG. 6).

Next, air is injected inside the inner layer 11 through the air supply port 48 of the support column 50 using the air pressure source 41 (FIG. 7) communicating with the jig 34 (Step 8 in FIG. 6, hereinafter referred to as "restoration step") (FIG. 5C). At this time, air is injected for about one seconds at a pressure of about 130 kPa. Injecting air inside the inner layer 11 causes the inner layer 11 to be pushed outwards from the support column 50. Thus, the inner layer 11 in contact with the support column 50 is separated from the support column 50 into contact with the outer layer 10 into substantially the original shape. The restoration step may be performed by injecting air inside the inner layer 11 not through the air supply port 48 of the support column 50 but through the air supply port 36 of the jig 34. In this case, even using a support column in which the air supply port 48 and the peripheral air supply ports 53 are not formed provides the same restoration effect. Instead of the air injection step, the air inside the inner layer 11 may be absorbed through the peripheral air supply ports 53. This provides the same effect in separating the inner layer 11. Both of the air injection through the air communication port 12 and the air suction through the peripheral air supply ports 53 may be performed. This allows the air inside the inner layer 11 to be exhausted more quickly, accelerating separation of the inner layer 11.

As described above, the use of the support column 50 in separating the inner layer 11 from the outer layer 10 suppresses deformation of the inner layer 11, preventing excessive deformation of the inner layer 11. This suppresses formation of creases in the inner layer 11 during the separation of the inner layer 11 and improves the restoration rate of the inner layer 11. Accordingly, the support column 50 has preferably a length of at least one half of the length of the easing 9 in the longitudinal direction, more preferably; a length of three fourths or more. Considering the restoration of the inner layer 11 in particular, the excessive deformation of the bottom (adjacent to the air communication port 12) of the inner layer 11 of the casing 9 may be suppressed. For this purpose, spacing between the end of the support column 50 and the bottom of the inner layer 11 may be small. Alternatively, a casing in which the inner layer opening 21 is covered with a sealing member or the like so that the inside of the inner layer is tightly sealed may be provided, and the inner-layer separation step may be started for the casing.

After the inner layer 11 is separated from the outer layer 10, ink is injected into the casing 9 through the inner layer opening 21.

Although FIGS. 4A to 4B illustrate the support column 50 in which four extending portions 55 are attached to the columnar portion 59 such that the cross section has a cross shape, the present disclosure is not limited to the cross-sectional shape. It is only required that one or more extending portions are attached to the columnar portion. In other words, the support column may have a larger surface area than a cylindrical support column with the same diameter. For example, a support column having five extending portions, such that the cross-section is star-shaped, increases in surface area, providing the same beneficial effect as the effect of the present embodiment.

Description of Example System

Figure 7:
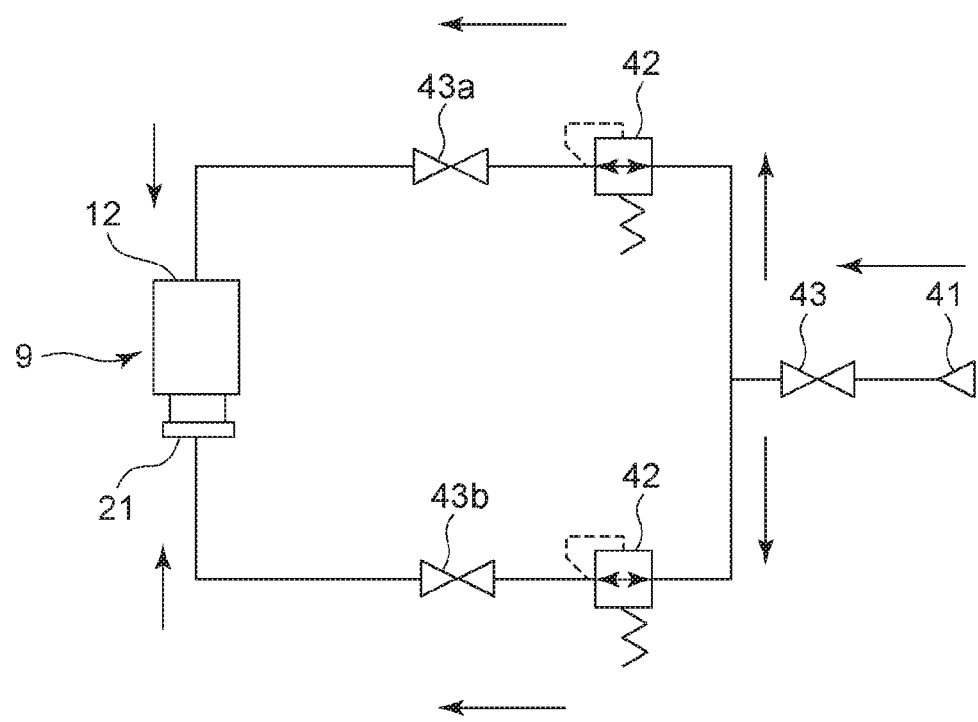
FIG. 7 is a schematic diagram of a system for use in separating the inner layer.

Next, a system used in separating the inner layer 11 described above will be described. FIG. 7 is a schematic diagram of the system. Air from the air pressure source 41 is split in two directions via the valve 43. The pressure of each air is reduced to a predetermined pressure with a pressure reducing valve 42. Then, the air is supplied to the area A and inside the inner layer 11.

Example Method for Separating Inner Layer of Comparative Example

Next, a comparative example of separation of the inner layer 11 according to the first embodiment will be described with reference to FIGS. 8A to 5C. The comparative example illustrates a case in which the inner layer 11 is separated without inserting the support column inside the inner layer 11. When air is injected into the area A through the air communication port 12, without inserting the support column inside the inner layer 11, the inner layer 11 changes significantly because there is no object, in the inner layer 11, that suppresses deformation due to separation of the inner layer 11 (FIG. 8B). Thus, even if air is thereafter injected inside the inner layer 11 through the inner layer opening 21, the inner layer 11 is partly restored but its restoration rate is low. This is because the significant damage to the shape of the inner layer 11 forms countless folds in the inner layer 11, but the air injection has not enough force to restore the original shape of the inner layer 11.

Example Welding Step

Figure 9:
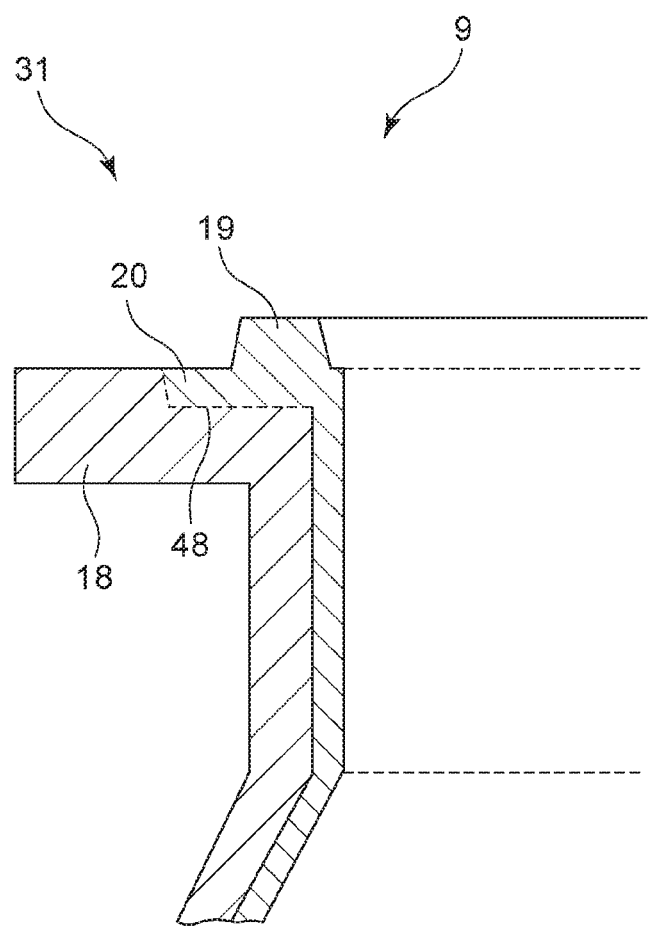
FIG. 9 is an enlarged view of the flange of the casing.

After ink is injected into the casing 9 after the inner-layer separation step, described above, the inner layer flange 20 of the casing 9 and the joint 1 are welded together. First, the flange 31 of the casing 9 will be described with reference to FIG. 9. FIG. 9 is an enlarged view of an area IX enclosed by the dotted line in FIG. 3C. The flange 31 of the casing 9 includes the outer layer flange 18 and the inner layer flange 20. The outer layer flange 18 is disposed on the outer layer 10, and the inner layer flange 20 is disposed on inner layer 11. Both of the outer layer flange 18 and the inner layer flange 20 are respectively disposed at the non-blown portions 24a of the outer layer 10 and the inner layer 11.

As illustrated in FIG. 9, the outer layer flange 18 is in contact with the inner layer flange 20 over a contact area 48. As described above, flanges are often disposed to fix a preform in injection blow molding.

Next, the welding of the inner layer flange 20 and the joint 1 will be described with reference to FIGS. 10A and 10B.

Figure 10A:
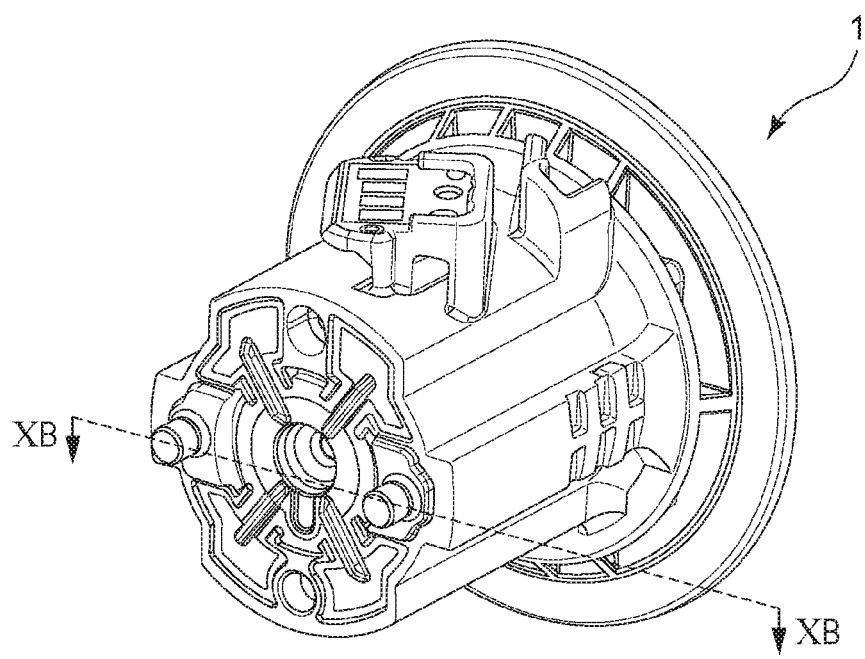
FIGS. 10A and 10B are schematic diagrams illustrating a joint and a weld rib.
Figure 10B:
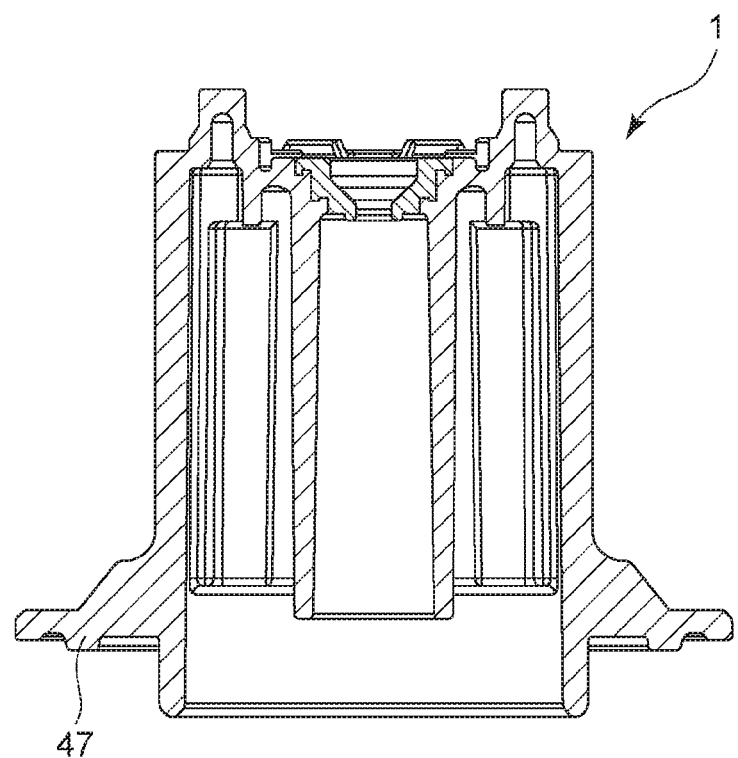

FIGS. 10A and 10B illustrate the joint 1. FIG. 10B illustrates a cross-sectional view of the joint 1 in FIG. 10A taken along line XB-XB. The joint 1 includes a weld rib 47. The inner layer flange 20 also includes a weld rib 19 (FIG. 9). The weld ribs 47 and 19 are joined together in a heated state to complete welding. Laser welding does not need the weld rib on the inner layer flange 20. However, the weld rib may be disposed to make the welding strength uniform.

Although various welding methods are applicable, infrared welding will be described as an example. Since infrared welding allows selective heating of weld ribs by using masking or the like, an increase in the peripheral temperature can be reduced as compared with heat plate welding. In particular, the ink cartridge 13 described here includes functional components such as the ink channel member 8 around the weld ribs. For this reason, this infrared welding method may be used. Infrared welding needs to absorb the infrared, unlike heat plate welding. For this reason, the material may be colored in block so as to complete welding in a short time. Unless the weld ribs are welded at a correct position, the welding area is decreased, which may cause ink leakage through the welded portion.

Example Air Vent Step

Next, the step of releasing the air in the casing 9 will be described with reference to FIGS. 11A to 11C. After the casing 9 and the joint 1 are joined together, the air in the casing 9 is released through the air vent port 14 of the joint 1. When the interior of the joint 1 is decompressed through the air vent port 14, the air-backflow check valve 7 is opened as illustrated in FIG. 11A so that the air in the casing 9 is released through the path indicated by arrow 33. At that time, the interface 32 of the ink rises as the air in the casing 9 is discharged. When the ink flows into the upward channel 8a and the downward channel 8b of the ink channel member 8 by releasing the air, the air discharge through the air vent port 14 is stopped. Along with the stop of the air discharge, the air-backflow check valve 7 is closed again to close the spacing between the joint 1 and the casing 9 (FIG. 11B). Thereafter, the air vent port 14 is sealed with the film 30 (FIG. 11C) to complete the production of the ink cartridge 13.

Example Second Embodiment

A method for separating the inner layer according to a second embodiment will be described with reference to FIGS. 12A to 2D. Since the system configuration is the same as that of the first embodiment, a description of the system configuration will be omitted. A feature of the present embodiment is that the inner layer 11a is separated by inserting a support column 51 in which an inner bag 49 is attached to a columnar portion 57 inside the inner layer 11. The inner bag 49 can be inflated and deflated by increasing and decreasing the pressure in the inner bag 49. The inner bag 49 is inflated by injecting air into the columnar portion 57 through the air supply port 48 of the columnar portion 57. The feature of the present embodiment will be mainly described, and descriptions of the same components as those of the first embodiment will be omitted.

Figure 12A:
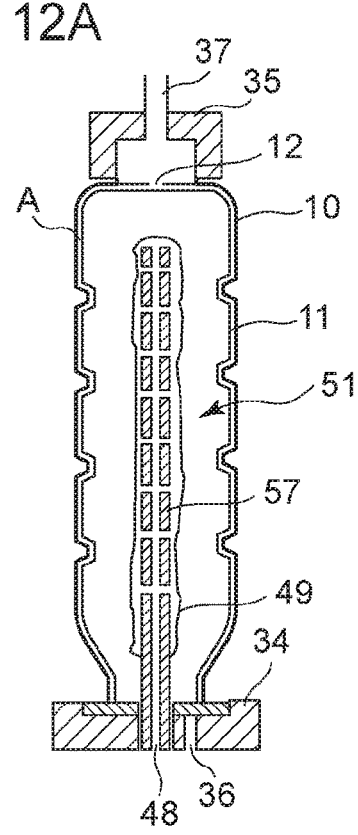
FIG. 12A is a schematic diagram of a casing in which a support column to which an inner bag is attached is inserted inside the inner layer.
Figure 12B:
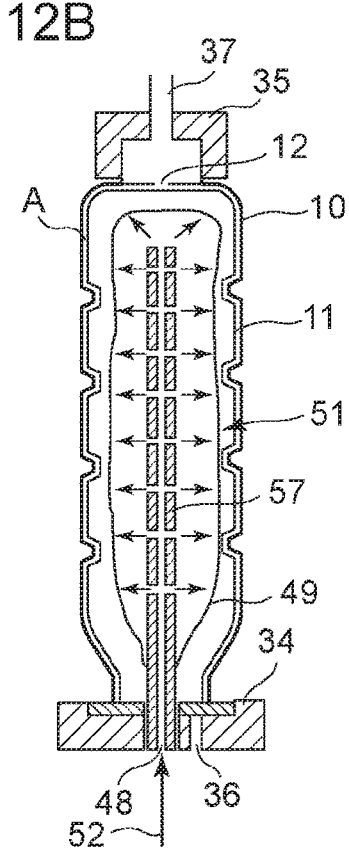
FIG. 12B is a schematic diagram of the casing in which the inner bag is inflated by injecting air into the inner bag through an air supply port of the support column.
Figure 12C:
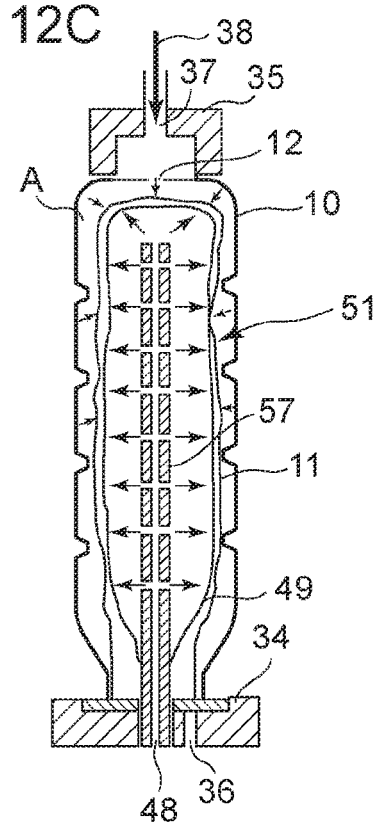
FIG. 12C is a schematic diagram of the casing in which air is injected into an area A through an air communication port, with the inner bag inflated.
Figure 12D:
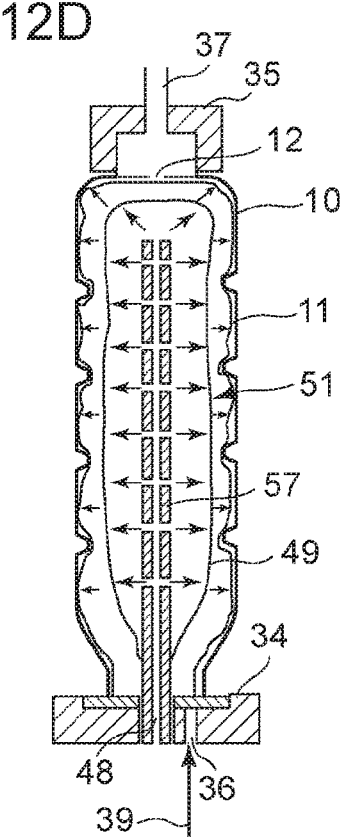
FIG. 12D is a schematic diagram of the casing in which the inner layer is being restored.

First, the support column 51 to which the inner bag 49 is mounted is inserted inside the inner layer 11 by attaching the casing 9 to the jigs 34 and 35 (FIG. 12A). Next, air is injected into the inner bag 49 through the air supply port 48 of the columnar portion 57 to inflate the inner bag 49 (FIG. 12B). Air is injected into the area A through the air communication port 12, with the inner bag 49 kept inflated (air injection step, FIG. 12C). At this time, the air injection through the air communication port 12 is performed at a pressure lower than the pressure in the inner bag 49. This is because if the air injection step is performed at a pressure higher than the pressure in the inner bag 49, the inflated inner bag 49 will be deflated. The inner layer 11 separated by the air injection step comes into contact with the inflated inner bag 49 to suppress the deformation, thus suppressing excessive defamation. After the inner layer 11 is separated into contact with the inner bag 49, and the inner layer 11 is sufficiently separated from the outer layer 10, a restoration step is performed by injecting air inside the inner layer 11 through the air supply port 36 of the jig 34 (FIG. 12D).

Thus, in the present embodiment, the inner bag 49 mounted to the columnar portion 57 is inflated, so that the surface area of the support column 51 is larger than the surface area of the cylindrical support column 50 in the first embodiment. This increases the area in which the separated inner layer 11 can come into contact with the support column 51, further ensuring the separation of the inner layer 11. The present embodiment is particularly advantageous in the case where the diameter of the inner layer opening 21 is small, so that a large-diameter support column cannot be inserted inside the inner layer 11. Since the inner bag 49 is deflated at the point when the support column 51 with the inner bag 49 is inserted inside the inner layer 11, the size of the support column 51 with the inner bag 49 is almost the same as the size of the columnar portion 57. Thereafter, the diameter of the support column 51 with the inner bag 49 is increased by inflating the inner bag 49. Thus, a support column with a large surface area can be inserted also inside the inner layer 11 of the casing 9 in which the diameter of the inner layer opening is small. Since the inflated inner bag 49, which is a relatively flexible member, serves as an inner layer 11 restricting member, damage to the inner layer 11 can be suppressed.

Example Third Embodiment

When the laminated preform 15 is blow molded, part of the inner layer 11 can enter the air communication port 12 of the outer layer 10. Thus, before the insertion step, the above embodiments may have a step of inserting a needle or the like through the air communication port 12 to push a portion of the inner layer 11 adjacent to the air communication port 12 from the outside to thereby separate the portion of the inner layer 11 adjacent to the air communication port 12 from the outer layer 10 (hereinafter referred to as "preseparation step"). Since the portion of the inner layer 11 adjacent to the air communication port 12 is thicker than the other portion of the inner layer 11, the portion of the inner layer 11 adjacent to the air communication port 12 is hardly separated from the outer layer 10. For this reason, performing the preseparation step before the insertion step allows the subsequent separation of the inner layer 11 to be performed with stability.

The preseparation step may be performed by injecting air. In this case, air of about 0.5 MPa in pressure is blown through the air communication port 12 for about one second. This provides the same beneficial effects as the effects using a needle or the like. Although an ink cartridge having two layers of an inner layer and an outer layer has been described, the disclosure is applicable also to a container having three or more layers, and the layer to be separated can be selected as appropriate according to the application of the container. For example, in the case where the disclosure is applied to a container having five layers, the second layer from the innermost layer may be separated from the third layer, or the fourth layer may be separated from the fifth layer.

The method according to the embodiments of the disclosure allows separating the inner layer from the outer layer while suppressing excessive deformation of the inner layer.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-087533 filed Apr. 27, 2018, which is hereby incorporated by reference herein in its entirety.

What is claimed is:

1. A method for manufacturing a container that includes a casing configured to contain a content, wherein the casing includes an inner layer having an inner layer opening for supplying the content to an outside and an outer layer covering the inner layer and having an air communication port to communicate between a space between the outer layer and the inner layer and the outside, the method comprising:
preparing, as the casing, a casing in which at least part of the inner layer and at least part of the outer layer are in contact with each other;
inserting a support column inside the inner layer through the inner layer opening of the prepared casing; and after inserting the support column,
separating the inner layer from the outer layer by supplying air into the space through the air communication port to bring part of the separated inner layer into contact with the support column,
wherein the support column includes a columnar portion and an extending portion extending from the columnar portion in a direction intersecting a longitudinal direction of the columnar portion.

2. The method according to claim 1, wherein separating the inner layer includes joining a jig to the air communication port and supplying air with a pressure higher than a pressure inside the inner layer from the jig into the space.

3. The method according to claim 1, wherein supplying the air into the space between the outer layer and the inner layer includes reducing a pressure of a space encompassed by the inner layer.

4. The method according to claim 1, wherein the columnar portion includes a supply port for supplying air inside the inner layer or absorbing air inside the inner layer.

5. The method according to claim 4, wherein supplying the air into the space between the outer layer and the inner layer includes absorbing the air inside the inner layer through the supply port in the columnar portion.

6. The method according to claim 1, wherein the support column is cross-shaped in cross section intersecting the longitudinal direction of the columnar portion.

7. The method according to claim 2, wherein separating the inner layer includes intermittently supplying air into the space.

8. The method according to claim 1, the method further comprising, before inserting the support column, inserting, as a preparation step, a needle through the air communication port to separate a portion of the inner layer adjacent to the air communication port from the outer layer.

9. The method according to claim 1, the method further comprising, before inserting the support column, supplying, as a preparation step, air through the air communication port to separate a portion of the inner layer adjacent to the air communication port from the outer layer.

10. The method according to claim 1, the method further comprising, after the separating the inner layer, supplying, as a restoration step, air inside the inner layer through the inner layer opening to restore a shape of the inner layer.

11. The method according to claim 1,
wherein the container comprises an ink cartridge configured to be installed in a liquid ejection apparatus configured to eject liquid droplets to a recording medium for printing, and
wherein the ink cartridge contains ink within a space encompassed by the inner layer.

12. The method according to claim 11, further comprising, after separating the inner layer, attaching a joint including a valve mechanism to the inner layer opening of the container.

13. The method according to claim 1, wherein the air communication port is disposed at a position opposing the inner layer opening.

14. The method according to claim 1, wherein the outer layer is made from polyethylene terephthalate, and the inner layer is made from polyethylene or polypropylene.

15. The method according to claim 1, wherein preparing the casing includes blow molding a laminated preform that is a lamination of (i) an inner-layer preform to be molded to the inner layer and (ii) an outer-layer preform to be molded to the outer layer.

16. The method according to claim 1, wherein preparing the casing includes forming the casing by injection blow molding.

17. The method according to claim 1, wherein the casing is cylindrical in shape.

18. The method according to claim 1, wherein a direction in which the extending portion extends and the longitudinal direction of the columnar portion intersect at right angles.

19. A method for separating an inner layer of a casing from an outer layer of the casing, wherein the casing is configured to contain a content, the inner layer has an inner layer opening for supplying the content to an outside, and the outer layer covers the inner layer and has an air communication port to communicate between a space between the outer layer and the inner layer and the outside, the method comprising:
preparing, as the casing, a casing in which at least part of the inner layer and at least part of the outer layer are in contact with each other;
inserting a support column inside the inner layer through the inner layer opening of the casing; and after inserting the support column,
separating the inner layer from the outer layer by supplying air into the space through the air communication port to bring part of the separated inner layer into contact with the support column,
wherein the support column includes a columnar portion and an extending portion extending outward from the columnar portion.

* * * * *